US012748717B2

(12) United States Patent
Carlson et al.

(10) Patent No.: US 12,748,717 B2
(45) Date of Patent: Sep. 29, 2026

(54) RECYCLING CHARGE BETWEEN CLOCK NETS

(71) Applicant: Auradine Inc., Santa Clara, CA (US)

(72) Inventors: David Carlson, Haslet, TX (US); Raju Rakha, Santa Clara, CA (US)

(73) Assignee: Auradine, Inc., Santa Clara, CA (US)

( * ) Notice: Subject to any disclaimer, the term of this patent is extended or adjusted under 35 U.S.C. 154(b) by 31 days.

(21) Appl. No.: 19/051,555

(22) Filed: Feb. 12, 2025

(65) Prior Publication Data

US 2026/0236421 A1 Aug. 13, 2026

(51) Int. Cl.

*G06F 13/40* (2006.01)
*G06F 1/10* (2006.01)

(52) U.S. Cl.

CPC ............ *G06F 13/4072* (2013.01); *G06F 1/10* (2013.01)

(58) Field of Classification Search

CPC ............................... G06F 13/4072; G06F 1/10
See application file for complete search history.

(56) References Cited

U.S. PATENT DOCUMENTS 5,615,376 A * 3/1997 Ranganathan ........ G06F 1/3218 713/601
5,850,157 A * 12/1998 Zhu ........................... G06F 1/04 327/295
7,750,715 B2 * 7/2010 Hsu ...................... G09G 3/3611 341/122
11,190,167 B2 * 11/2021 Bozorg .................... H04B 1/16

* cited by examiner

*Primary Examiner* — Tim T Vo
(74) *Attorney, Agent, or Firm* — Fish & Richardson P.C.

(57) ABSTRACT

One aspect of the present disclosure relates to an electronic circuit including: a first clock net with a first clock wire coupled to a first set of latches or flip-flops; a second clock net with a second clock wire coupled to a second set of latches or flip-flops; a first driver circuit coupled to the first clock wire and configured to drive the first clock net to one of a first clock state or a second clock state; a second driver circuit coupled to the second clock wire and configured to drive the second clock net to one of the first clock state or the second clock state; and a shared device interconnecting the first and second clock nets, the shared device configured to couple the first clock wire to the second clock wire to transfer charge between the first clock net and the second clock net.

25 Claims, 10 Drawing Sheets

401

| | P | N | S | |
|---|---|---|---|---|
| CLK is 0 | 0 | 1 | 0 | |
| 412 CLK is transitioning to 1 | 0 | 1 | 0 | |
| | 0 | 0 | 0 | CLK and CLK_N are floating |
| | 0 | 0 | 1 | CLK and CLK_N share charge |
| | 0 | 0 | 0 | CLK and CLK_N are floating |
| | 1 | 0 | 0 | |
| CLK is 1 | 1 | 0 | 0 | |
| 414 CLK is transitioning to 0 | 0 | 0 | 0 | CLK and CLK_N are floating |
| | 0 | 0 | 1 | CLK and CLK_N share charge |
| | 0 | 0 | 0 | CLK and CLK_N are floating |
| | 0 | 1 | 0 | |

*FIG. 4B*

501

| | | P$_1$ | N$_1$ | S | P$_2$ | N$_2$ | CLK1 | CLK2 | |
|---|---|---|---|---|---|---|---|---|---|
| | | 0 | 0 | 0 | 1 | 1 | 1 | 0 | |
| 1 → 0 | 522 | 1 | 0 | 0 | 1 | 0 | 1 | 0 | Floating |
| | | 1 | 0 | 1 | 1 | 0 | 1/2 | 1/2 | |
| | | 1 | 0 | 0 | 1 | 0 | 1/2 | 1/2 | Floating |
| | | 1 | 1 | 0 | 0 | 0 | 0 | 1 | |
| 0 → 1 | 524 | 1 | 0 | 0 | 1 | 0 | 0 | 1 | Floating |
| | | 1 | 0 | 1 | 1 | 0 | 1/2 | 1/2 | |
| | | 1 | 0 | 0 | 1 | 0 | 1/2 | 1/2 | Floating |
| | | 0 | 0 | 0 | 1 | 1 | 1 | 0 | |

FIG. 5B

RECYCLING CHARGE BETWEEN CLOCK NETS

TECHNICAL FIELD

The present disclosure generally relates to signal processing and power control. Some aspects of the present disclosure relate to electronic circuits and communications between electronic components, including recycling charge between clock nets.

BACKGROUND

In an electronic circuit, a clock net propagates clock signals from a clock source to other components of the circuit. When a clock signal transitions from low to high, voltage on the clock net increases. As this happens, charge on the clock net increases proportionally. When the clock signal transitions from high to low, voltage decreases and the charge on the clock net dissipates. The process of repeatedly charging and discharging the clock net may consume a large amount of power.

SUMMARY

One aspect of the present disclosure relates to an electronic circuit including: a first clock net including a first clock wire coupled to a first set of latches or flip-flops; a second clock net including a second clock wire coupled to a second set of latches or flip-flops; a first driver circuit coupled to the first clock wire and configured to drive the first clock net to one of a first clock state or a second clock state; a second driver circuit coupled to the second clock wire and configured to drive the second clock net to one of the first clock state or the second clock state; and a shared device interconnecting the first and second clock nets, the shared device configured to couple the first clock wire to the second clock wire to transfer charge between the first clock net and the second clock net.

In some implementations, the first clock state is a high voltage state and the second clock state is a low voltage state, the first clock net is in the first clock state and the second clock net is in the second clock state, and voltage flows from the first clock net to the second clock net when the shared device couples the first clock wire to the second clock wire.

In some implementations, the first driver circuit is turned off before the shared device couples the first clock wire to the second clock wire, and the second driver circuit is turned on after the shared device decouples the first clock wire from the second clock wire.

In some implementations, the first driver circuit transitions to the second clock state after the shared device decouples the first clock wire from the second clock wire, and the second driver circuit is driven to the first clock state in response to the second driver circuit being turned on.

In some implementations, the first clock state is a low voltage state and the second clock state is a high voltage state, the first clock net is in the first clock state and the second clock net is in the second clock state, and voltage flows from the second clock net to the first clock net when the first clock wire is coupled to the second clock wire.

In some implementations, the first clock state corresponds to a supply voltage, and the second clock state corresponds to a ground voltage.

In some implementations, the shared device is further configured to decouple the first clock wire from the second clock wire after a specified period of time corresponding to a clock cycle for the electronic circuit.

In some implementations, at least one of the first clock net or the second clock net is driven to an intermediate state between the first clock state and the second clock state in response to the shared device coupling the first clock wire to the second clock wire.

In some implementations, the first clock net and the second clock net are undriven when the shared device couples the first clock wire to the second clock wire.

In some implementations, the shared device includes one of an N-channel metal-oxide semiconductor (NMOS) or a P-channel metal-oxide semiconductor (PMOS).

In some implementations, each of the first driver circuit and the second driver circuit includes a set of NMOS transistors, and one or more drive signals are common to the first driver circuit and the second driver circuit.

In some implementations, the first clock net and the second clock net have inverse clock signals.

In some implementations, each of the first driver circuit and the second driver circuit includes one or more of NMOS transistors and PMOS transistors, the first driver circuit is driven by one or more first drive signals and the second driver circuit is driven by one of more second drive signals, and the first drive signals are different from the second drive signals.

In some implementations, the first clock net and the second clock net have independent clock signals.

Another aspect of the present disclosure relates to a method including: determining that a first clock net in an electronic circuit is transitioning from a first clock state to a second clock state while a second clock net in the electronic circuit is transitioning from the second clock state to the first clock state, the first clock net including a first clock wire coupled to a first set of latches or flip-flops, the second clock net including a second clock wire coupled to a second set of latches or flip-flops; and coupling the first clock wire of the first clock net to the second clock wire of the second clock net in response to determining that the first clock net is transitioning from the first clock state to the second clock state while the second clock net is transitioning from the second clock state to the first clock state.

In some implementations, the first clock state is a high voltage state and the second clock state is a low voltage state, where coupling the first clock wire to the second clock wire causes voltage to flow from the first clock net to the second clock net.

In some implementations, the first clock state corresponds to a supply voltage, and the second clock state corresponds to a ground voltage.

In some implementations, the first clock wire and the second clock wire are coupled via a shared device, where coupling the first clock wire of the first clock net to the second clock wire of the second clock net includes providing a signal to transition the shared device to an on state.

In some implementations, the first clock net is driven by a first driver circuit and the second clock net is drive by a second driver circuit, the method further including: turning off the first driver circuit before coupling the first clock wire to the second clock wire.

In some implementations, the method further includes: decoupling the first clock wire from the second clock wire after a specified period of time; and turning on the second driver circuit after decoupling the first clock wire from the second clock wire.

In some implementations, the shared device includes one of an NMOS or a PMOS, and each of the first driver circuit and the second driver circuit includes one or more of NMOS transistors or PMOS transistors.

In some implementations, the method further includes controlling the first driver circuit and the second driver circuit using one or more common drive signals, where the first clock net and the second clock net have inverse clock signals.

In some implementations, the method further includes: controlling the first driver circuit using one or more first drive signals; and controlling the second driver circuit using one or more second drive signals that are different from the first drive signals, where the first clock net and the second clock net have independent clock signals.

In some implementations, at least one of the first clock net or the second clock net is driven to an intermediate state between the first clock state and the second clock state in response to coupling the first clock wire to the second clock wire.

In some implementations, coupling the first clock wire to the second clock wire includes coupling the first clock wire to the second clock wire while the first clock net and the second clock net are in an undriven state.

The details of one or more embodiments of these systems and methods are set forth in the accompanying drawings and the description below. Other features, objects, and advantages of these systems and methods will be apparent from the description and drawings, and from the claims.

BRIEF DESCRIPTION OF THE FIGURES

FIG. 4B is a truth table of the example circuit shown in FIG. 4A.

FIG. 5B is a truth table of the example circuit shown in FIG. 5A.

DETAILED DESCRIPTION

Figure 1:
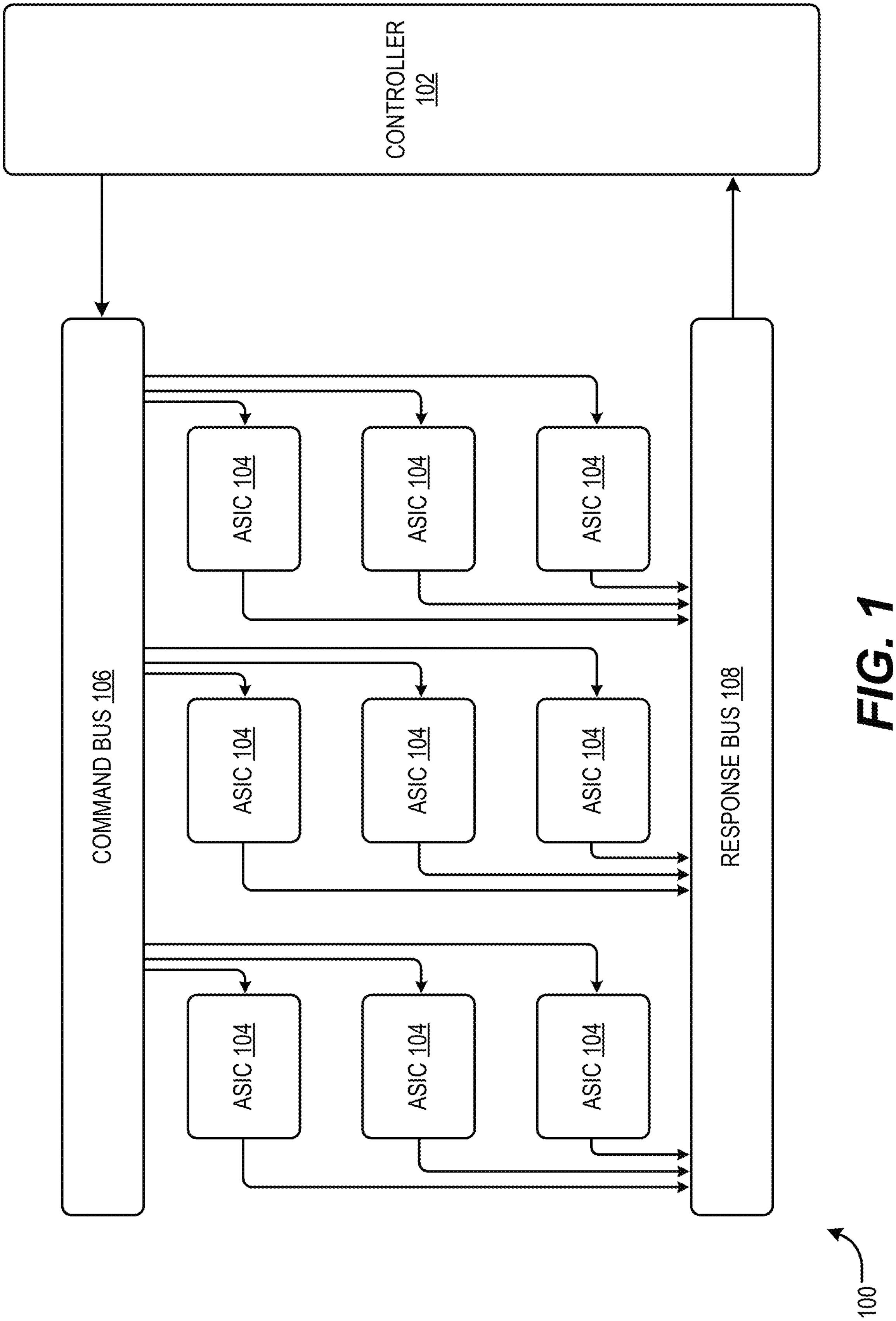
FIG. 1 is a schematic diagram of an example electronic device circuit comprising a plurality of application-specific integrated circuits (ASICs), according to some implementations.

A computing system may include a number of application-specific integrated circuits (ASICs) arranged on a printed circuit board (PCB). Each ASIC may include a number of hash engines (also referred to as miners or math engines) that are configured to perform various operations, such as mathematical computations. For example, each of the plurality of ASICs can control respective hash engines to perform cryptographic hash computations or other high data rate computations in parallel. Each hash engine may include a number of latches (or other electronic components such as flip-flops) that are driven by (e.g., change state) one or more clock signals. As described herein, a latch is an electronic component that can store one bit of information. A latch has two stable states, typically represented as "0" and "1". A latch retains its state until the state is changed by an input signal. The input signal to a latch can be a clock signal, which is propagated from a clock source by a clock net. As described herein, a clock net refers to the various interconnections between a clock signal/wire, latches, and other components (e.g., transistors) of an electronic circuit, and is used to propagate clock signals to other components of the circuit, e.g., latches, enabling these components to change state. When a clock signal goes from low to high (referred to hereinafter as a rising clock signal), voltage on the clock net increases from $V_{ss}$ (ground) to $V_{dd}$ (supply). As this happens, charge (Q) on the clock net increases proportionally. When the clock signal goes from high to low (referred to hereinafter as a falling clock signal), voltage decreases and the charge on the clock net is dissipated. This process of repeatedly charging and discharging the clock net may consume a large amount of power, e.g., due to capacitance of the clock net circuit. In some implementations, roughly 20%-25% of the supply power is consumed by clock nets. It is desirable to reduce such power consumption by clock nets, to reduce wastage in the amount of power used to drive the ASICs (e.g., to drive the hash engines in the ASICs). In this context, voltage and charge are used as interchangeable terms, related as $Q=C*V$ where Q is charge (e.g., measured in coulombs), C is capacitance (e.g., measured in farads), and V is voltage (e.g., measured in volts). For every low to high transition of a wire, the energy required is $Q*V$ or $C*V*V$. Power (P) is proportional to charge and voltage, expressed as $P=f*C*V*V$, where f is frequency.

In accordance with aspects of the present disclosure, a first clock net with a falling clock signal may be coupled to (e.g., shorted with) a second clock net with a rising clock signal. This allows voltage to drain from the first clock net to the second clock net. As this happens, charge dissipates from the first clock net and builds in the second clock net. In other words, charge from the first clock net is effectively "recycled" or transferred from the first clock net to the second clock net. By moving charge from one clock net to another, both clock nets get closer to their desired state: the first clock net gets closer to a low voltage state (e.g., ground or $V_{ss}$), and the second clock net gets closer to a high voltage state (e.g., supply voltage or $V_{dd}$). Once the process is complete, the second clock net is decoupled from the first clock net. With the second clock net now in a partially charged state, less power is needed to drive the second clock net to a high voltage state to provide clock signal to hash engine components, e.g., latches. In doing so, that charge that would have gone to the supply gets recycled into a different clock net used to drive the hash engines, leading to significant savings in the supplied power to drive the hash engines. In the following description, some aspects are described in the context of inverted clock nets, but the techniques described herein can be used to recycle charge between any two clock nets with clock signals switching at roughly the same time in opposite directions.

FIG. 1 is a schematic diagram of an example electronic circuit 100 comprising a plurality of application-specific integrated circuits (ASICs), according to some implementations. The electronic circuit 100 includes multiple ASICs 104, which can be of any one or more suitable types in various implementations, such as general-purpose processor chips, field-programmable gate array (FPGA) chips, etc. The electronic circuit 100 further includes a controller 102, for example, a central processing unit (CPU), computing device, host device, etc. The electronic circuit 100 can further include multiple buses, such as a command bus 106, a response bus 108, a clock bus, a reset bus, one or more power buses, etc. In some implementations, the ASICs 104, controller 102, command bus 106, response bus 108, a VDD supply, and/or a V2 supply are mounted on/coupled to a common board, e.g., a printed circuit board (PCB). For example, interconnections between the ASICs 104 and/or between the ASICs 104 and other elements (e.g., the controller 102, command bus 106, and/or response bus 108) can include metal traces in and/or on the common board.

Figure 2:
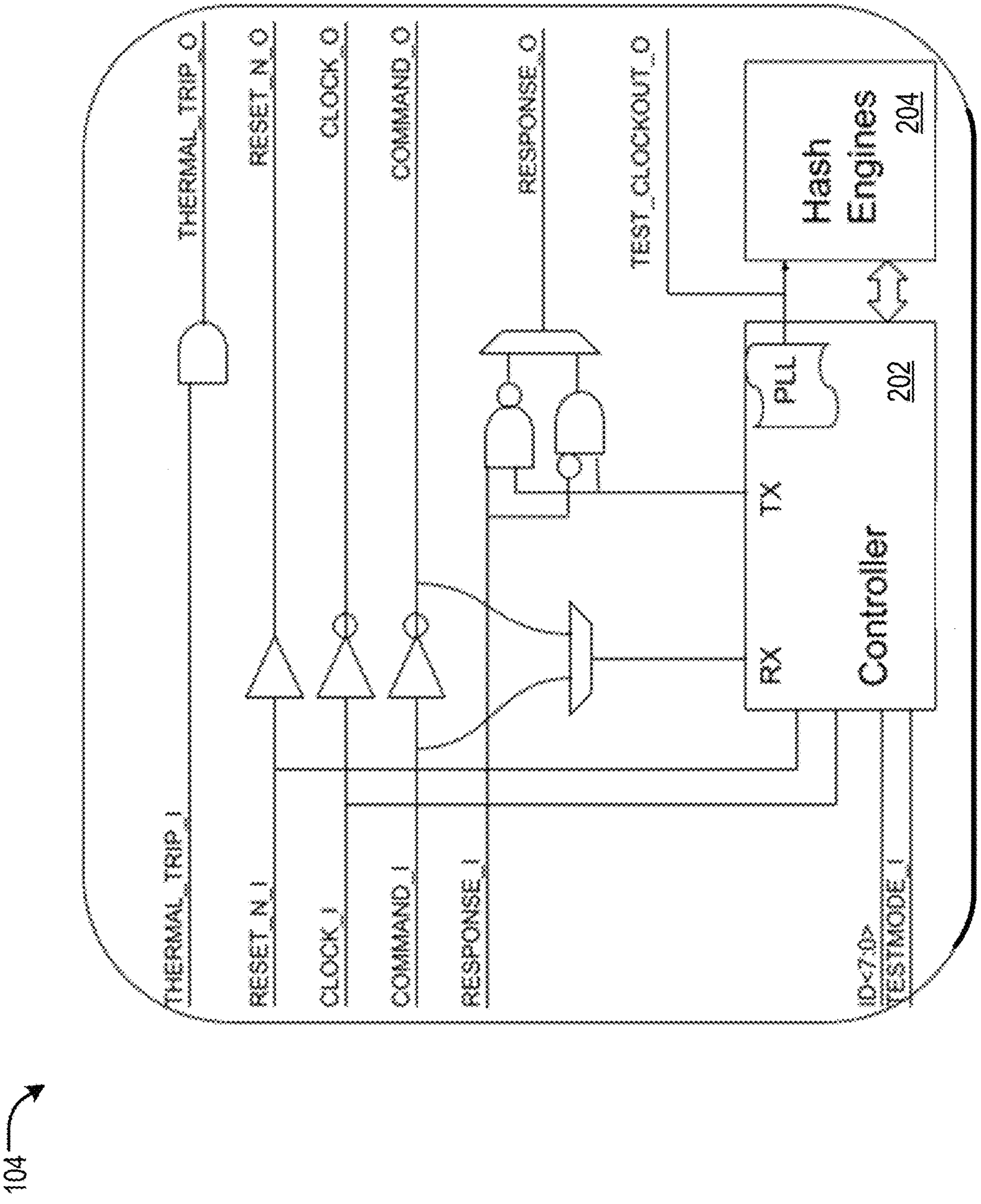
FIG. 2 is a schematic diagram of an example application-specific integrated circuit (ASIC), according to some implementations.

In some implementations, the ASICs 104 and other elements of the electronic circuit 100 are included in a common enclosure, cabinet, and/or case. An example schematic of an ASIC 104 is shown in FIG. 2, as discussed below. In this example, the ASICs 104 are grouped into in three groups (e.g., corresponding to rows or columns in which the ASICs 104 are arranged), each group including three ASICs 104. However, in some implementations, the ASICs 104 are not divided into groups. Moreover, the number of groups and number of ASICs 104 in each group can vary in some implementations.

Each of the ASICs 104 can include terminals (e.g., pins) coupled to one or more of these buses. For example, each of the ASICs 104 can include a control input terminal coupled to the command bus 106, which provides input signals from the controller 102 to each of the ASICs 104. In some implementations, each of the ASICs 104 can include an input terminal coupled to a clock bus for receiving a clock signal, and/or an input terminal coupled to a reset bus for receiving a reset signal.

In some implementations, the controller 102 is on a common board with the ASICs 104. In some implementations, the controller 102 is separated from the ASICs 104, e.g., outside an enclosure housing the ASICs 104. Although the controller 102 is shown as both providing input signals to and receiving output signals from the ASICs 104, separate elements (e.g., separating computing devices) can provide inputs to and receive outputs from the ASICs 104 in some implementations.

The electronic circuit 100 may be configured to perform cryptographic operations, e.g., hash computations for a blockchain mining process, using the ASICs 104. In such cases, the electronic circuit 100 can be deployed for applications that rely on blockchain mining, e.g., for cryptocurrency mining, maintaining linked records of digital transactions, etc. In this context, a blockchain is a decentralized and distributed digital ledger that records units of information, e.g., transactions, across multiple computers or nodes.

In some implementations, the ASICs 104 can be configured or customized to perform computations instructed by the controller 102. For example, the ASICs 104 can receive (e.g., at input terminals) input signals from the controller 102 instructing the ASICs 104 to perform computations for a particular task. After receiving these input signals, each of the ASICs 104 can perform the computations indicated/commanded by the input signal and transmit an output signal (e.g., from an output terminal) to the response bus 108.

In some implementations, the controller 102 is configured to carry out arithmetic and logic operations, data manipulations, and control flow management in accordance with operations of the electronic circuit 100. In some implementations, the controller 102 can include components such as a control unit, an arithmetic logic unit, one or more registers, and one or more caches, etc. The control unit of controller 102 manages the flow of data between different components of the controller 102, and can be configured to fetch instructions from a memory, decode the instructions, and coordinate execution of the instructions. The arithmetic logic unit can be configured to perform arithmetic operations (e.g., addition, subtraction, multiplication, and division), and logical operations (e.g., AND, OR, and NOT) on data. The registers of the controller 102 can be configured to store temporary data, instructions, and intermediate results during processing. The registers can also include a program counter which keeps track of the address of the next instruction to be executed, and general-purpose registers for storing data. The caches of the controller 102 can be configured to temporarily store frequently accessed data and instructions.

In some implementations, the controller 102 is configured to transmit input signals to the ASICs 104 via the command bus 106. The input signals may be provided to the ASICs 104 in parallel. For example, at least some of the ASICs 104 can receive the input signals from the controller 102 (in some cases with intermediate processing such as level-shifting, isolation, etc., as discussed further below), as opposed to from another of the ASICs 104 in a series-configuration "daisy-chained" arrangement in which a signal output of each ASIC 104 is coupled to a signal input of another ASIC 104 in turn. For example, as discussed in further detail below, the controller 102 can provide the input signals for receipt by each of the ASICs 104, and the input signals can include identifier(s) identifying target ASICs 104 to perform operations instructed by the input signals.

The ASICs 104 are electrically connected (with respect to their signal inputs and signal outputs) between the controller 102 (e.g., by a coupling to at least one control bus providing the input signals) and the response bus 108. For example, an output of each ASIC 104 can be electrically connected to or otherwise provided to the response bus 108. In some implementations, the response bus 108 includes an input terminal corresponding to each of the ASICs 104, and the input terminal is connected (in some cases with intermediate processing, such as level-shifting) to the signal output terminal (e.g., output terminal) of the corresponding ASIC 104. In some implementations, each input terminal of the response bus 108 can be arranged/configured to receive an idle signal, or no signal, from the corresponding ASIC 104 when the corresponding ASIC 104 has not obtained a nonce that makes the new block header hash meet the difficulty target, and to receive a series of bits in a pattern that indicates a value of the nonce when the corresponding ASIC 104 has obtained a nonce that makes the new block header hash meet the difficulty target.

Signals exchanged to/from the ASICs 104 can correspond to interconnections, e.g., metal traces, wires, and/or other conductive elements. For example, in some implementations, the electronic circuit 100 includes for each ASIC 104, (i) at least one interconnection electrically coupling a signal input terminal of the ASIC 104 to the controller 102 (in some cases with one or more intermediate elements such as a level-shifter, isolator, etc.), and (ii) at least one interconnection electrically coupling a signal output terminal of the ASIC 104 to the response bus 108 (in some cases with one or more intermediate elements such as a level-shifter, isolator, etc.). As described above, the ASICs 104 are driven by clock signals, reception of which enable hash engine components in the ASICs to change state as part of performing cryptographic operations by the ASICs. Management of the clock signals are described in greater detail in the following sections.

FIG. 2 is a schematic diagram of an example ASIC 104, according to some implementations. The ASIC 104 includes various input and output terminals, including a clock-in terminal ("CLOCK_I") for receiving a clock signal; a command-in terminal ("COMMAND_I") (corresponding to a signal input that receives input signals) for receiving commands (e.g., from the controller 102); and a response-out terminal ("RESPONSE_0") for outputting data, such as data indicative of nonces identified as a result of hash computations. The response-out-terminal can output data to the response bus 108.

Other terminals included in this example of the ASIC 104 include reset-in terminal ("RESET_N_I") for receiving (e.g., from the controller) reset commands that cause the ASIC 104 to reset; a thermal trip-in ("THERMAL_TRIP_I") terminal for receiving thermal trip signals from a thermal trip bus; ID input(s) ("ID<7:0>") for receiving individual addressing/commands; and test mode-in ("TESTMODE_I") for enabling manufacturer test mode. In some implementations, the ASIC 104 is devoid of ID input pins or test mode-in pins, or both.

In some implementations where the ASIC 104 is connected in a series configuration with other ASICs 104, signature ASIC 104 further includes terminals configured to provide signals to or from the other series-connected ASICs 104. Using the output terminals depicted in FIG. 2, thermal trip signals, reset signals, clock signals, command signals, and test clock signals can be provided to a second ASIC 104, which can in turn pass those signals to a third ASIC 104, etc., so that common thermal trip, reset, clock, command, and/or test clock signals are provided, in series, to all ASICs 104 on the board or to a group of ASICs 104. Circuitry of the ASIC 104 can permit signals, including computation results, to be transferred in series between ASICs 104. A response-in ("RESPONSE I") terminal can be configured to receive output signals, including computation results, from other ASICs 104.

The terminals shown in FIG. 2 are examples, and the ASIC 104 may not include all of the terminals depicted, and/or can include one or more additional terminals. For example, as some of the terminals shown in FIG. 2 are included to facilitate a series-configured arrangement of the ASIC 104 that differs from the parallel-configured arrangement shown in FIG. 1, some of the terminals shown in FIG. 2 can be omitted. For example, response-in ("RESPONSE_I") terminals are not present in implementations where ASIC 104 is connected in a parallel configuration with other ASICs 104, as shown in FIG. 1. In such implementations, data or other signals output by an ASIC 104 is transmitted to the controller 102 or other external entity via the response bus 108. The ASIC 104 can further include one or more power input terminals, e.g., a first power input terminal for receiving a power voltage from a VDD supply, and one or more second power input terminals for receiving one or more power voltages from a V2 supply.

The ASIC 104 includes a local controller 202 configured to manage and coordinate operations of various components within the ASIC 104. Controller 202 can be configured to serve as an interface between hash engines 204 and other circuits or components of the ASIC 104. In some examples, the controller 202 can be configured to receive an input signal from the signal input, and to transmit a corresponding control signal to the hash engines 204. For example, after receiving a signal from the controller 102, the controller 202 can instruct the hash engines 204 to perform cryptographic hash computations. In some examples, the controller 202 is communicatively coupled to the hash engines 204, and can obtain computation results from the hash engines 204. The controller 202 can transmit the computation results and/or values derived therefrom (e.g., signals indicating obtained nonce values) via the response-out terminal, e.g., as an output signal.

The ASIC 104 includes a number of hash engines 204 (e.g., 238 engines). In some implementations, each hash engine 204 includes hardware components configured to perform cryptographic hash computations. For example, a hash engine 204 can perform cryptographic hash computations using hash function algorithms such as SHA-1, SHA-256, MD5, etc. In some implementations, each hash engine 204 includes a number of clock wires (e.g., 128 clock wires). Each clock wire may be connected to a number of latches (e.g., 1000 latches or more). Within each hash engine, there may be 225,000 latches or more. As described in the following sections, in some implementations, charge is recycled between a plurality of clock nets corresponding to the clock wires used to drive the latches.

In some implementations, relatively few signals are provided in/out of the ASIC 104, compared to other chips configured for series operation in which control signals, response signals, etc., from each chip are provided to another chip. For example, in some implementations, the ASIC 104 does not receive/transmit a response-in signal from another chip, a clock-out signal for another chip, a reset-out signal for another chip, and/or a command-out signal for another chip. Correspondingly, in some implementations, the ASIC 104 does not include terminals (shown in FIG. 2) corresponding to these signals, and/or does not include at least some of the indicated circuitry that corresponds to processing these signals. For example, the TX terminal of the controller 202 can be connected directly to the response-out terminal of the ASIC 104. This reduction in terminals and/or circuit elements can, in some cases, provide reduced manufacturing costs and/or simplified chip operation.

The ASIC 104 may be configured for parallel operation in some implementations as described above. For example, the ASIC 104 can be configured to receive reset, clock, and command signals in parallel with other ASICs 104 (e.g., from controller 102, as opposed to from another ASIC 104), and to provide output signals, including computation results, in parallel with other ASICs 104 (e.g., to the response bus 108, as opposed to another ASIC 104). The terminals, elements, and operation of the ASIC 104 can be configured as described for the ASIC 104, except where noted otherwise or suggested otherwise by context. Each of the command-in, clock-in, reset-in, and thermal trip-in terminals can correspond to input terminals (e.g., respective different input terminals), and the response-out terminal can correspond to output terminals.

Figure 3:
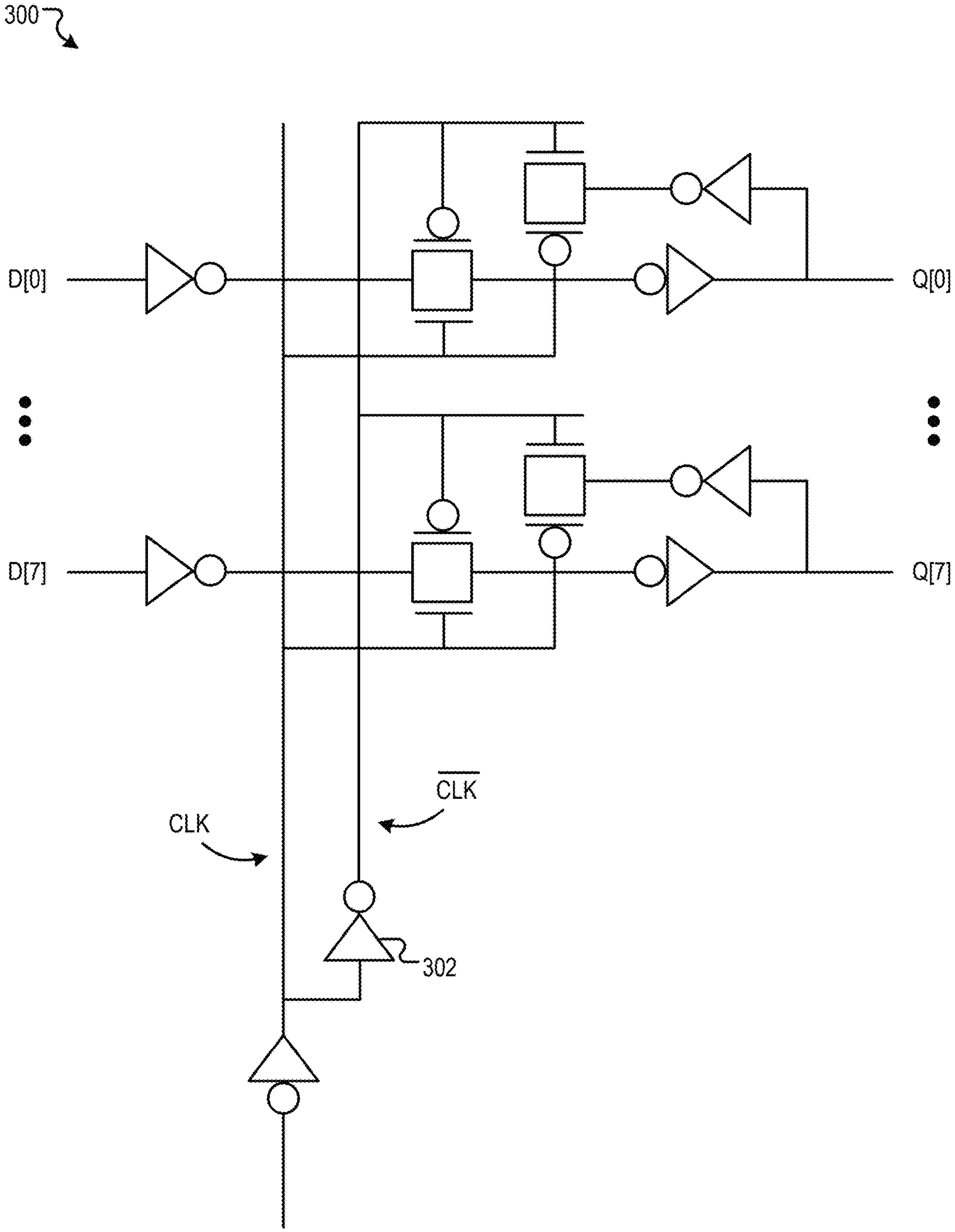
FIG. 3 is a schematic diagram of an example circuit with inverted clock nets, according to some implementations.

FIG. 3 is a schematic diagram of an example circuit 300 with inverted clock nets, according to some implementations. The example circuit 300 of FIG. 3 includes an 8-bit latch (denoted as D[0] . . . D[7] in the input and Q[0] . . . Q[7] in the output), although other latch configurations (such as 32-bit latches) are also possible. The example circuit 300 may be implemented by one or more hash engines 204 of the ASIC 104 (as shown and described with reference to FIGS. 1 and 2). In some implementations, each hash engine 204 is configured with multiple instances of the example circuit 300.

Clocking for latches or flip-flops typically involves one or two wires toggling frequently with a large amount of capacitance. This process may consume a relatively large amount of power. One conventional method to reduce power consumption is to create a resonant tank circuit with an inductor and the clock net. In this conventional method, the amount of clock power saved depends on the resistance of the clock net and the inductor used. This resonant method is referred to as adiabatic clocking. Although some tank circuits are promising, integrating inductors can be difficult and expensive. For bitcoin mining, roughly 25% of the power consumed is due to clocking, so reducing clocking power may be desirable in some cases.

The following sections describe novel charge recycling techniques that reduce the power consumed by clock nets, while being easier to implement compared to inductors as described above, or cheaper, or both. The circuits for realizing these novel techniques can also take up less space in the hash engines/ASICs compared to using inductors. The techniques can be used in many scenarios, including (but not limited to) the scenarios discussed below. In one scenario (depicted in FIGS. 3 and 4A), the latch (or flip-flop) elements of the circuit 300 are driven by two clock nets that are inversions of each other. These clock nets are denoted as CLK and CLK_N (or $\overline{\text{CLK}}$), where CLK_N is an inverted version (using inverter 302) of the CLK signal. FIG. 3 shows how these clock nets can be used to drive many latches. Typically, these clock nets would be driven by two inverters. In accordance with aspects of the present disclosure, the clock nets can be driven using the following modified sequence:

- CLK is driven to 0 (0% $V_{dd}$), CLK_N is driven to 1 (100% $V_{dd}$);
- CLK and CLK_N need to transition;
- CLK is undriven (e.g., floating) but remains at 0, CLK_N is undriven but remains at 1;
- CLK is briefly shorted to (e.g., coupled with) CLK_N; CLK rises to roughly 40% of $V_{dd}$; CLK_N falls to roughly 60% of $V_{dd}$;
- CLK is driven to 1, CLK_N is driven to 0.

A similar sequence can be used to transition in the other direction. In some implementations, the transition from one state to the next is based on the clock cycle timing. The duration of the clock cycle depends on the clock frequency.

Figure 4A:
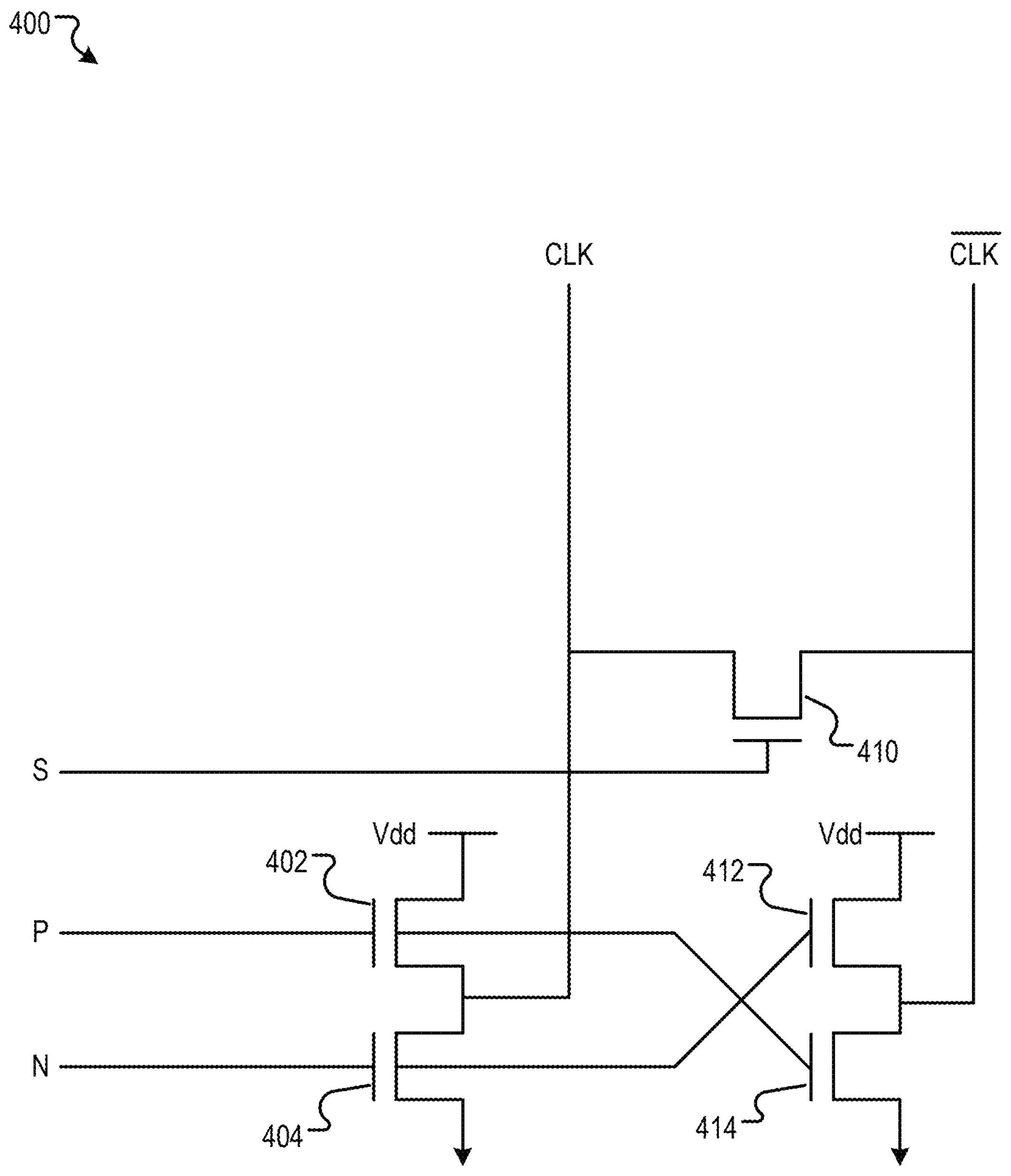
FIG. 4A is a schematic diagram of an example circuit that is configured to recycle charge between two clock nets, according to some implementations.

FIG. 4A is a schematic diagram of an example circuit 400 that can be used to drive, float, and short the two inverted clock nets. The circuit 400 comprises a plurality of N-channel metal-oxide semiconductor (NMOS) transistors 402, 404, 410, 412 and 414. Transistors 402 and 404 form a first driver circuit coupled to CLK, while transistors 412 and 414 form a second driver circuit coupled to CLK_N. Transistor 410 is shared between the two clock nets, interconnecting CLK and CLK_N. Drive signals P, N, and S are used to drive the first and second driver circuits and the transistor 410: signals P and N are used to drive transistors 402 and 404 respectively, and these signals are inverted to drive transistors 414 and 412 respectively; and signal S drives transistor 410, which is used to short CLK and CLK_N.

FIG. 4B is a truth table 401 of the example circuit 400, showing the corresponding sequence of controls before, during, and after the two clock nets are shorted together. The truth table 401 shows example signal states (P, N, S) and corresponding state transitions for NMOS transistors, where 1 corresponds to a high signal and an "on" transistor state, while 0 corresponds to a low signal and an "off" transistor state. In some implementations, the duration of each state described below and the change in signal level and corresponding transition to a next state occurs within a clock cycle. For example, in some cases, the duration of each stage can be approximately 4 inverter delays. The entire sequence completes in approximately 100 pico seconds, where the clock period is 2000 pico seconds for reference. As shown with respect to the state transition sequence 414, when signal P is low (P=0) and N is high (N=1), CLK is connected to ground ($V_{ss}$), while CLK_N is connected to supply voltage $V_{dd}$. This drives CLK low and CLK_N high. To begin the transition, all five transistors 402, 404, 412, 414 and 410 are turned off (P=0, N=0, S=0) in a clock cycle. These transistors have enough charge to maintain their values for the duration of the transition. Next (e.g., in the next clock cycle), the S signal is turned on (P=0, N=0, S=1). This activates transistor 410, which shorts CLK and CLK_N together, causing CLK_N to discharge through transistor 410, which sends charge to CLK. In this manner, the voltage of CLK_N reduces while the voltage of CLK increases. In some implementations, the voltage of CLK_N reduces to around 60% of $V_{dd}$, and the voltage of CLK ends up to around 40% of $V_{dd}$. As a result, both clock nets get closer to their desired state without using any external power. Once the transition is complete, the S signal is turned off (P=0, N=0, S=0), which causes the clocks to float again. Signal P is then turned on (P=1, N=0, S=0) in the next clock cycle. This drives CLK high to $V_{dd}$ (CLK is 1) and CLK_N to ground ($V_{ss}$).

An opposite sequence happens in the next cycle, in which CLK transitions from $V_{dd}$ to ground, while CLK_N moves from ground to $V_{dd}$. As shown with respect to the state transition sequence 414, to begin the transition, all five transistors 402, 404, 412, 414 and 410 are turned off (P=0, N=0, S=0). This causes CLK and CLK_N to be in a floating state, not connected to either $V_{dd}$ or ground. Next (e.g., in the next clock cycle), the S signal is turned on (P=0, N=0, S=1). This activates transistor 410, which shorts CLK and CLK_N together, causing CLK to discharge through transistor 410, which sends charge to CLK_N. In doing so, the voltage of CLK reduces while the voltage of CLK_N increases. As a result, both clock nets get closer to their desired state without using any external power. Once the transition is complete, the S signal is turned off (P=0, N=0, S=0), which causes the clocks to float again. Signal N is then turned on (P=0, N=1, S=0) in the next clock cycle. This drives CLK_N high to $V_{dd}$ (CLK_N is 1) and CLK to ground ($V_{ss}$), completing the next cycle.

In some implementations, the transistors 402, 404, 412, 414 and 410 used to drive the two clock nets are NMOS devices, as noted above, which operate at a higher voltage than the clock signal being generated. In such cases, a high voltage supply may used. This voltage supply may be visible on the board. However, the techniques described herein can also be implemented using other controls and P-channel metal oxide semiconductor (PMOS) transistors.

In the above manner, with the driving sequence described above, charge that would have otherwise gone to the supply is "recycled" into the opposite clock net. Theoretically, the voltage of the two clock nets would be equal after shorting, and the power savings would be roughly 50%. In practice, however, shorting the two clock nets together would likely provide slightly lower power savings (e.g., around 40%), which can be due to the power consumed by the circuit 400, or the two clock nets, or both. The power consumption of each clock net can be determined according to the following equation:

$$P = C * V^2 * f$$

where P is power, V is the voltage of the clock net, C is the effective capacitance of the clock net, and f is the clock frequency.

Figure 5A:
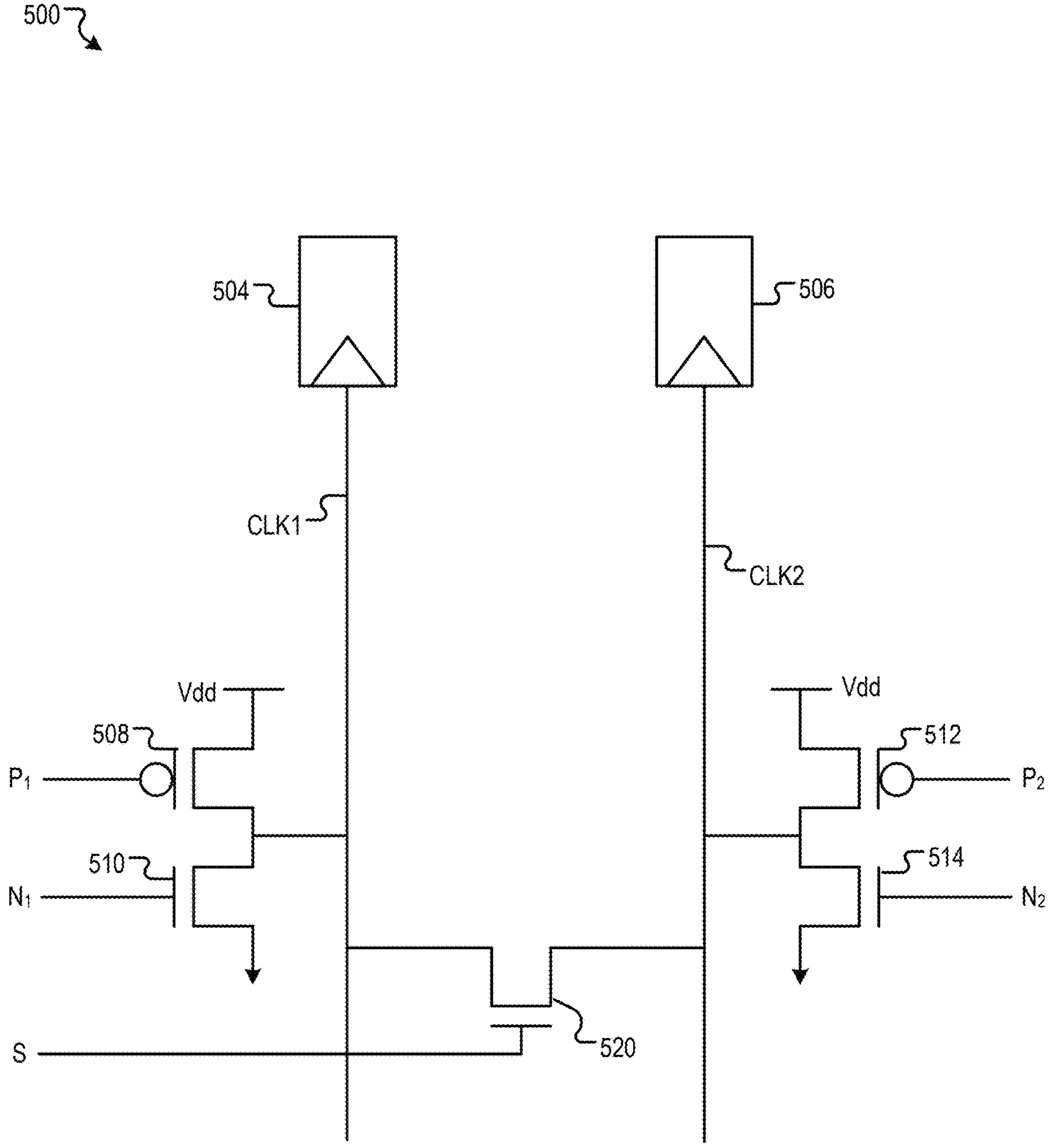
FIG. 5A is a schematic diagram of another example circuit that is configured to recycle charge between two clock nets, according to some implementations.

The above techniques to recycle charge can also be used when clocks are single-ended, but there are multiple groups of latches/flops driven by respective clocks that switch at the same time in opposite directions. FIG. 5A is a schematic diagram of an example circuit 500 used to recycle charge between two open-ended clock nets, CLK1 and CLK2. The circuit 500 comprises PMOS transistor 508 and NMOS transistor 510 forming a first driver circuit coupled to CLK1; PMOS transistor 512 and NMOS transistor 514 forming a second driver circuit coupled to CLK2; and NMOS transistor 520 that is coupled to both CLK1 and CLK2. Drive signals P1, N1, P2, N2 and are used to drive the first and second driver circuits and the transistor 520: signals P1 and N1 are used to drive transistors 508 and 510 respectively, while signals P2 and N2 are used to drive transistors 512 and 514 respectively; signal S drives transistor 520, which is used to short CLK1 and CLK2. A first group of latches 504 is driven by CLK1, while a second group of latches 506 is driven by CLK2. The two clock nets are configured to move in opposite directions based on the signals P1, N1, and P2, N2, such that the first group of latches 504 closes whenever the second group of latches 506 opens.

FIG. 5B is a truth table 501 of the example circuit 500, showing the sequence of controls before, during, and after the two clock nets are shorted together. The truth table 501 shows example signal states (P1, N1, P2, N2, S) and corresponding state transitions for PMOS and NMOS transistors, where 1 corresponds to a high signal and 0 corresponds to a low signal. For a PMOS device, 1 corresponds to an "off" state and 0 corresponds to an "on" state. For an NMOS device, 1 corresponds to an "on" state and 0 corresponds to an "off" state. As described above, the duration of each state and the change in signal level and corresponding transition to a next state occurs within a clock cycle in some cases. When transistor 508 is on while transistor 510 is off (P1=0, N1=0), CLK1 is connected to $V_{dd}$ and is high (CLK1=1); at this time, transistor 512 is off while transistor 514 is on (P2=1, N2=1), CLK2 is connected to ground ($V_{ss}$) and is low (CLK2=0). Transistor 520 is also off (S=0), decoupling CLK1 and CLK2. To begin the transition, as shown with respect to sequence 522, signal P1 is turned on while signal N2 is turned off (P1=1, N1=0, P2=1, N2=0, S=0), leading to all five transistors 508, 510, 512, 514 and 520 being turned off. These causes CLK1 and CLK2 to be disconnected from both $V_{dd}$ and ground, and they float. Next, the S signal is turned on (P1=1, N1=0, P2=1, N2=0, S=1). This activates transistor 520, which shorts CLK1 and CLK2 together, causing CLK1 to discharge through transistor 520, which sends charge to CLK2. In this manner, the voltage of CLK1 reduces while the voltage of CLK2 increases. As a result, both clock nets get closer to their desired state without using any external power. In steady state, half the charge of CLK1 is transferred to CLK2 (CLK1=CLK2=½), although power leakage in the circuit causes the voltages to be less than that. Once the transition is complete, the S signal is turned off (P1=1, N1=0, P2=1, N2=0, S=0), which causes the clocks to float again. Signal N1 is then turned on and signal P2 is turned off (P1=1, N1=1, P2=0, N2=0, S=0). This leads to transistor 508 being turned off while transistor 510 is turned on, which connects CLK1 to ground ($V_{ss}$) and is driven low (CLK1=0); transistor 512 is turned on while transistor 514 is turned off, which connects CLK2 to supply $V_{dd}$ and is driven high (CLK2=1). Due to shorting of CLK1 and CLK2 in the intermediate during the transition, the amount of charge used to drive CLK2 to high is reduced, e.g., by 50% theoretically.

An opposite sequence happens in the next cycle, in which CLK1 transitions from ground to $V_{dd}$, while CLK2 moves from $V_{dd}$ to ground. As shown with respect to the state transition sequence 524, to begin the transition, all five transistors 508, 510, 512, 514 and 520 are turned off (P1=1, N1=0, P2=1, N2=0, S=0). This causes CLK1 and CLK2 to be in a floating state, not connected to either $V_{dd}$ or ground. Next, the S signal is turned on (P1=1, N1=0, P2=1, N2=0, S=1). This activates transistor 520, which shorts CLK1 and CLK2 together, causing CLK2 (which is high) to discharge through transistor 520, which sends charge to CLK1 (which is low). In doing so, the voltage of CLK2 reduces while the voltage of CLK1 increases. As a result, both clock nets get closer to their desired state without using any external power. Once the transition is complete, the S signal is turned off (P1=1, N1=0, P2=1, N2=0, S=0), which causes the clocks to float again. Signal N2 is then turned on while signal P1 is turned off (P1=0, N1=0, P2=1, N2=1, S=0). This leads to transistor 508 being turned on while transistor 510 is turned off, which connects CLK1 to $V_{dd}$ and is driven high (CLK1=1); transistor 512 is turned off while transistor 514 is turned on, which connects CLK1 to ground ($V_{ss}$) and is driven low (CLK2=0), completing the next cycle.

In the above manner, when switching, the driver circuits (e.g., transistors 508 and 510 in the first driver circuit, and transistors 512 and 514 in the second driver circuit) are turned off so the clock nodes are floating (e.g., not being driven by a supply voltage $V_{dd}$). The shared device (transistor 520) can then be activated to short the two clock nets together, moving charge from the high clock (e.g., the clock net in a high voltage state) to the low clock (e.g., the clock net in a low voltage state), leaving both clock nets with an intermediate voltage. The shared transistor 520 is then turned off, and the driver devices (e.g., transistors 508 and 510 in the first driver circuit, and transistors 512 and 514 in the second driver circuit) are selectively turned on depending on the cycle, which moves the clocks nets rest of the way to $V_{dd}/V_{ss}$.

Although some aspects of the present disclosure are described in the context of opposing clock signals (e.g., clock signals moving towards different states), the techniques described herein can be applied to any sequence of clocks, so long as two or more of the N clocks switch at the same time in opposite directions.

Figure 6:
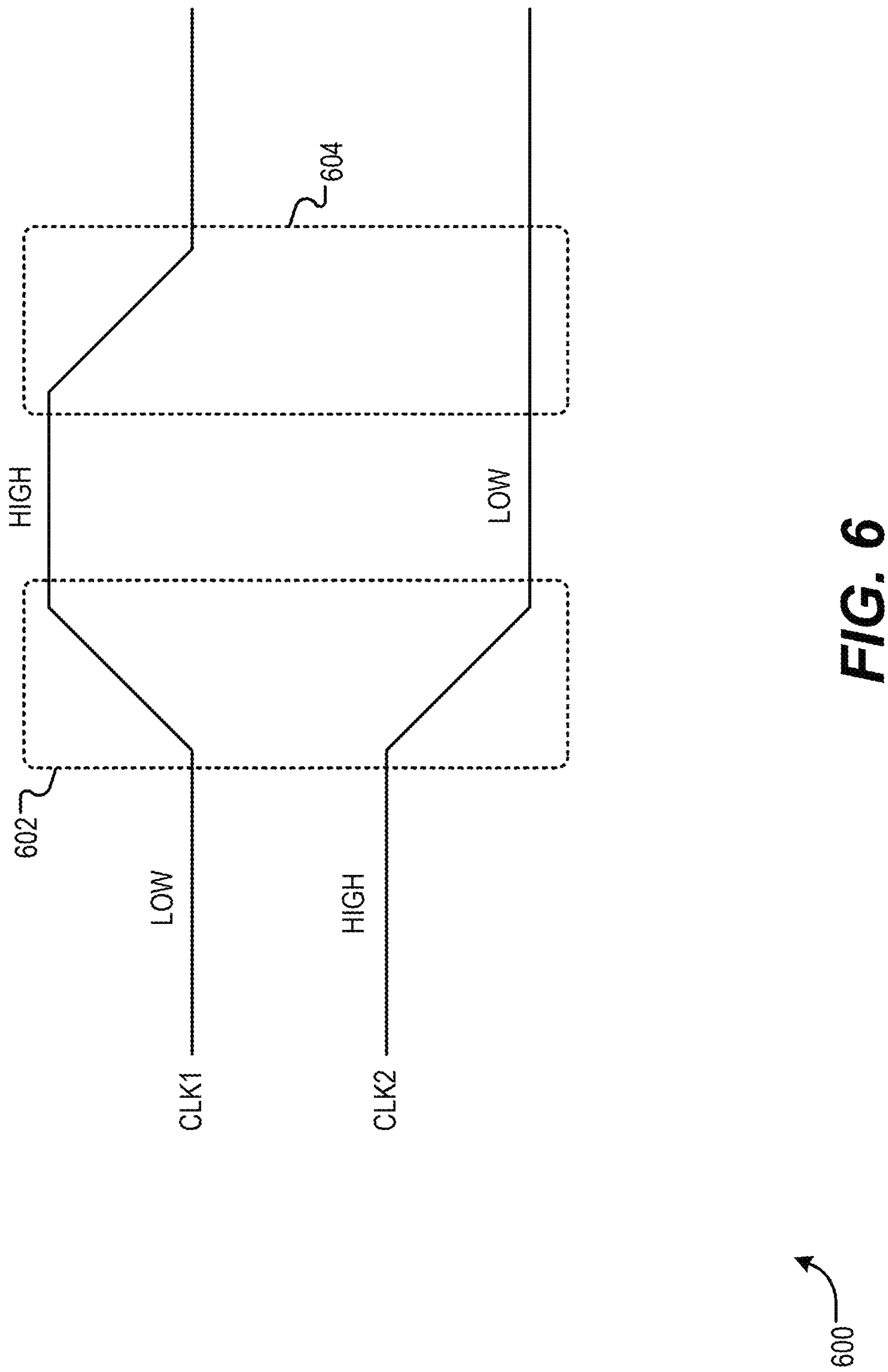
FIG. 6 is a timing diagram of two example clock signals, according to some implementations.

FIG. 6 is a timing diagram 600 of two example clock signals, according to some implementations. In the timing diagram 600 of FIG. 6, a first clock signal (e.g., CLK1) of a first clock net moves from low to high as a second clock signal (e.g., CLK2) of a second clock net moves from high to low, meaning CLK1 and CLK2 move in opposite directions during a time interval 602. When this happens, charge can be "recycled" from the second clock net to the first clock net by shorting the two clock nets together for a period of time (as described with reference to FIGS. 3-5). This can reduce the amount of charge (and power) needed for the first clock net to reach a high voltage state.

In some implementations, CLK1 and CLK2 are inversions of each other. For example, CLK2 (also referred to as CLK or CLK_N) may be coupled to CLK1 by an inverter (as shown and described with reference to FIG. 3), in which case CLK1 and CLK2 will always move in opposite directions. In other implementations, CLK1 and CLK2 switch independently. For example, the first clock net and the second clock net may belong to separate circuits or hash engines that use different clock frequencies, switching patterns, etc. This scenario is shown in FIG. 6: during the time interval 604, CLK1 goes from high to low, but CLK2 remains low. So long as CLK1 and CLK2 move in opposite directions at some point (e.g., during the time interval 602), the techniques described herein can be used to reduce the amount of power needed to drive the first clock net to a high voltage state.

Figure 7:
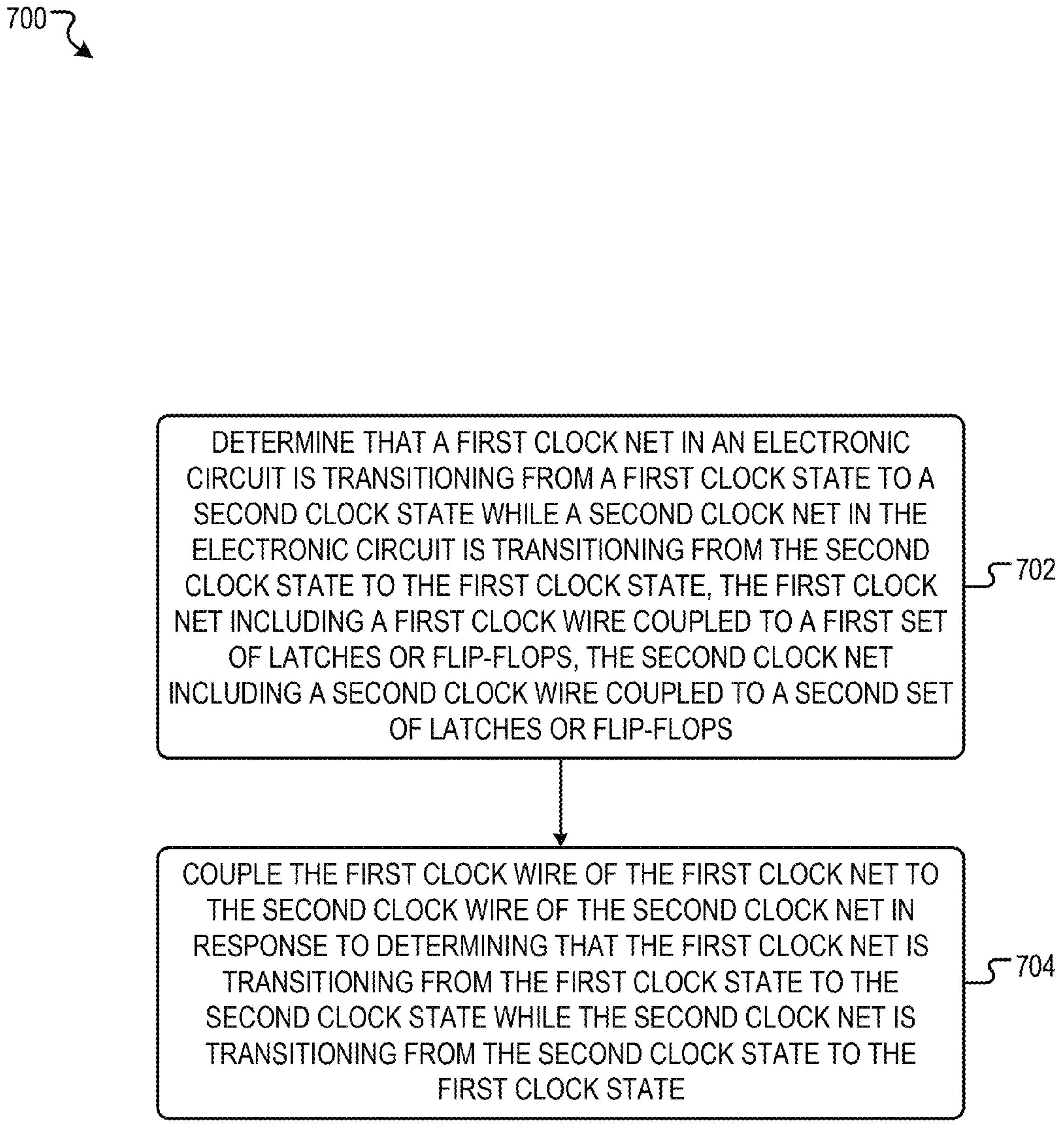
FIG. 7 is a flowchart of an example method for recycling charge between clock nets, according to some implementations.

FIG. 7 is a flowchart of an example method 700 for recycling charge between clock nets, according to some implementations. For clarity of presentation, the method 700 is generally described in the context of the preceding figures. For example, the method 700 can be performed by one of the ASICs 104 shown and described with reference to FIG. 1, or any suitable system, environment, software, hardware, or combination thereof. In some implementations, operations of the method 700 can be run in parallel, in combination, in loops, or in any order. The example method 700 can be modified or reconfigured to include additional, fewer, or different steps (not shown in FIG. 7), which can be performed in the order shown or in a different order.

The method 700 includes determining (702) that a first clock net is transitioning from a first clock state to a second clock state while a second clock net is transitioning from the second clock state to the first clock state, the first clock net including a first clock wire coupled to a first group of latches, the second clock net including a second clock wire coupled to a second group of latches. For example, as described with respect to FIGS. 4A-4B and 5A-5B, the first clock state can be a low voltage state (e.g., ground or $V_{ss}$) and the second clock state can be a high voltage state (e.g., supply or $V_{dd}$), such that the first clock net (e.g., CLK or CLK1) is transitioning from low to high while the second clock net (e.g., CLK_N or CLK2) is transitioning from high to low. Alternatively, the first clock state can be a high voltage state and the second clock state can be a low voltage state, such that the first clock net is transitioning from high to low, while the second clock net is transitioning from low to high. Further, the first group of latches can comprise one or more latches and the second group of latches can comprise one or more latches. The first clock net can be coupled to one or more flip-flops in addition, or as an alternative, to the first group of latches. Additionally or alternatively, the second clock net can be coupled to one or more flip-flops in addition, or as an alternative, to the second group of latches.

The method 700 further includes coupling (704) the first clock wire of the first clock net to the second clock wire of the second clock net in response to determining that the first clock net is transitioning from the first clock state to the second clock state while the second clock net is transitioning from the second clock state to the first clock state. For example, the signal S can be turned on to activate transistor 410 in the circuit 400 as described with respect to FIG. 4B, which shorts CLK and CLK_N, allowing charge to flow from the clock net at the high voltage to the clock net at the low voltage. As another example, the signal S can be turned on to activate transistor 520 in the circuit 500 as described with respect to FIG. 5B, which shorts CLK1 and CLK2, allowing charge to flow from the clock net at the high voltage to the clock net at the low voltage.

Figure 8:
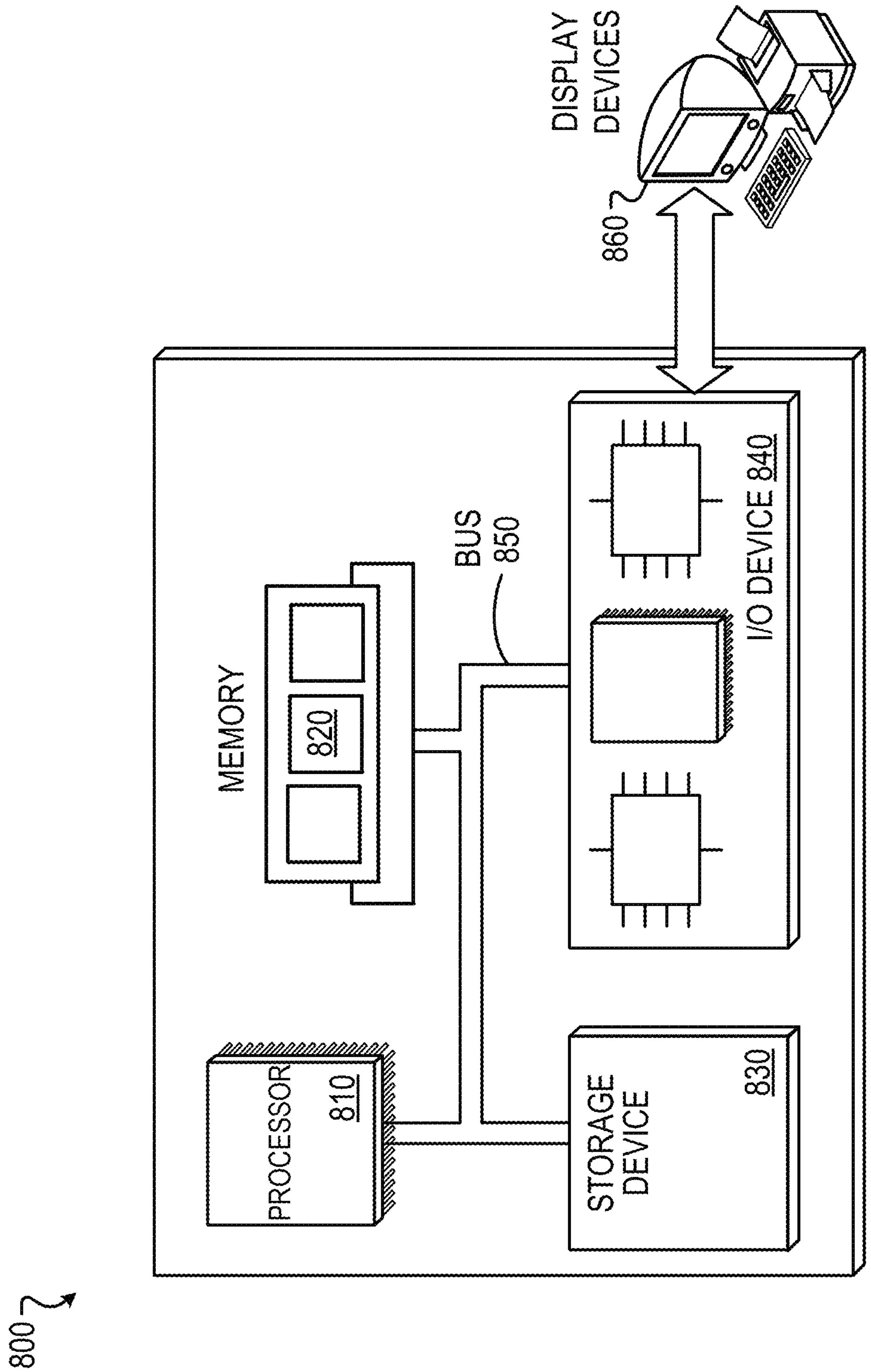
FIG. 8 is a schematic diagram of an example computer system, according to some implementations.

FIG. 8 is a schematic diagram of an example computer system 800. In some implementations, the computer system 800 may include or be a part of one or more of the entities described herein. For example, the computer system 800 may implement aspects of the electronic circuit 100 shown and described with reference to FIG. 1. As depicted in FIG. 8, the computer system 800 includes a processor 810, a memory 820, a storage device 830 and an input/output device 840. Each of these components can be interconnected, for example, by a system bus 850. The processor 810 is capable of processing instructions for execution within the computer system 800.

In some implementations, the processor 810 is a single-threaded processor, a multi-threaded processor, or another type of processor. The processor 810 is capable of processing instructions stored in the memory 820 or on the storage device 830. The memory 820 and the storage device 830 can store information within the computer system 800. For example, the memory 820 and/or the storage device 830 can store measurement data from one or more sensors as they are received by the control system, as described in the preceding sections. Additionally, or alternatively, the memory 820 and/or the storage device 830 can store historical measurement data. Although the computer system 800 is shown as having one processor 810, one memory 820, and one storage device 830 for illustrative purposes, the computer system 800 can include any number of processors 810, memories 820, and storage devices 830 based on system requirements.

The input/output device 840 provides input/output operations for the computer system 800. In some implementations, the input/output device 840 can include one or more of a network interface device (for example, an Ethernet card), a serial communication device (for example, an RS-232 port), or a wireless interface device (for example, an 502.11 card, a 3G wireless modem, a 4G wireless modem, or a 5G wireless modem), or some combination thereof. In some implementations, the input/output device can include driver circuits or driver devices configured to receive input data and send output data to other input/output devices, for example, a keyboard, printer, and/or display devices 860. In some implementations, mobile computing devices, mobile communication devices, and other devices can also be used.

While the present disclosure describes many examples, these should not be construed as limitations on the scope of an invention that is claimed or of what may be claimed, but rather as descriptions of features specific to particular embodiments. Certain features that are described in the context of separate embodiments can also be implemented in combination in a single embodiment. Conversely, various features that are described in the context of a single embodiment can also be implemented in multiple embodiments separately or in any suitable sub-combination. Although some features may be described as acting in certain combinations and even initially claimed as such, one or more features from a claimed combination in some cases can be excised from the combination, and the claimed combination may be directed to a sub-combination or a variation of a sub-combination. Similarly, while some operations may be depicted in the drawings in a particular order, this should not be understood as requiring that such operations are performed in the particular order shown or in sequential order, or that all illustrated operations be performed, to achieve desirable results.

A number of embodiments have been described. Nevertheless, it is understood that various modifications can be made without departing from the spirit and scope of the present disclosure. Accordingly, other embodiments are within the scope of the following claims.

We claim:

1. An electronic circuit comprising:

a first clock net comprising a first clock wire coupled to a first plurality of latches or flip-flops;

a second clock net comprising a second clock wire coupled to a second plurality of latches or flip-flops;

a first driver circuit coupled to the first clock wire and configured to drive the first clock net to one of a first clock state or a second clock state;

a second driver circuit coupled to the second clock wire and configured to drive the second clock net to one of the first clock state or the second clock state; and a shared device interconnecting the first and second clock nets, the shared device configured to couple the first clock wire to the second clock wire to transfer charge between the first clock net and the second clock net.

2. The electronic circuit of claim 1, wherein the first clock state is a high voltage state and the second clock state is a low voltage state, wherein the first clock net is in the first clock state and the second clock net is in the second clock state, and wherein voltage flows from the first clock net to the second clock net when the shared device couples the first clock wire to the second clock wire.

3. The electronic circuit of claim 2, wherein the first driver circuit is turned off before the shared device couples the first clock wire to the second clock wire, and wherein the second driver circuit is turned on after the shared device decouples the first clock wire from the second clock wire.

4. The electronic circuit of claim 3, wherein the first driver circuit transitions to the second clock state after the shared device decouples the first clock wire from the second clock wire, and the second driver circuit is driven to the first clock state in response to the second driver circuit being turned on.

5. The electronic circuit of claim 1, wherein the first clock state is a low voltage state and the second clock state is a high voltage state, wherein the first clock net is in the first clock state and the second clock net is in the second clock state, and wherein voltage flows from the second clock net to the first clock net when the first clock wire is coupled to the second clock wire.

6. The electronic circuit of claim 1, wherein the first clock state corresponds to a supply voltage, and the second clock state corresponds to a ground voltage.

7. The electronic circuit of claim 1, wherein the shared device is further configured to decouple the first clock wire from the second clock wire after a specified period of time corresponding to a clock cycle for the electronic circuit.

8. The electronic circuit of claim 4, wherein at least one of the first clock net or the second clock net is driven to an intermediate state between the first clock state and the second clock state in response to the shared device coupling the first clock wire to the second clock wire.

9. The electronic circuit of claim 1, wherein the first clock net and the second clock net are undriven when the shared device couples the first clock wire to the second clock wire.

10. The electronic circuit of claim 1, wherein the shared device comprises one of an N-channel metal-oxide semiconductor (NMOS) or a P-channel metal-oxide semiconductor (PMOS).

11. The electronic circuit of claim 1, wherein each of the first driver circuit and the second driver circuit comprises a plurality of NMOS transistors, and wherein one or more drive signals are common to the first driver circuit and the second driver circuit.

12. The electronic circuit of claim 11, wherein the first clock net and the second clock net have inverse clock signals.

13. The electronic circuit of claim 1, wherein each of the first driver circuit and the second driver circuit comprises one or more of NMOS transistors and PMOS transistors, wherein the first driver circuit is driven by one or more first drive signals and the second driver circuit is driven by one of more second drive signals, and wherein the first drive signals are different from the second drive signals.

14. The electronic circuit of claim 13, wherein the first clock net and the second clock net have independent clock signals.

15. A method comprising:

determining that a first clock net in an electronic circuit is transitioning from a first clock state to a second clock state while a second clock net in the electronic circuit is transitioning from the second clock state to the first clock state, the first clock net comprising a first clock wire coupled to a first plurality of latches or flip-flops, the second clock net comprising a second clock wire coupled to a second plurality of latches or flip-flops; and coupling the first clock wire of the first clock net to the second clock wire of the second clock net in response to determining that the first clock net is transitioning from the first clock state to the second clock state while the second clock net is transitioning from the second clock state to the first clock state.

16. The method of claim 15, wherein the first clock state is a high voltage state and the second clock state is a low voltage state, and wherein coupling the first clock wire to the second clock wire causes voltage to flow from the first clock net to the second clock net.

17. The method of claim 15, wherein the first clock state corresponds to a supply voltage, and the second clock state corresponds to a ground voltage.

18. The method of claim 15, wherein the first clock wire and the second clock wire are coupled via a shared device, and wherein coupling the first clock wire of the first clock net to the second clock wire of the second clock net comprises providing a signal to transition the shared device to an on state.

19. The method of claim 18, wherein the first clock net is driven by a first driver circuit and the second clock net is drive by a second driver circuit, the method further comprising:

turning off the first driver circuit before coupling the first clock wire to the second clock wire.

20. The method of claim 19, further comprising:

decoupling the first clock wire from the second clock wire after a specified period of time; and turning on the second driver circuit after decoupling the first clock wire from the second clock wire.

21. The method of claim 19, wherein the shared device comprises one of an N-channel metal-oxide semiconductor (NMOS) or a P-channel metal-oxide semiconductor (PMOS), and wherein each of the first driver circuit and the second driver circuit comprises one or more of NMOS transistors or PMOS transistors.

22. The method of claim 21, further comprising controlling the first driver circuit and the second driver circuit using one or more common drive signals, wherein the first clock net and the second clock net have inverse clock signals.

23. The method of claim 21, further comprising:

controlling the first driver circuit using one or more first drive signals; and controlling the second driver circuit using one or more second drive signals that are different from the first drive signals, wherein the first clock net and the second clock net have independent clock signals.

24. The method of claim 15, wherein at least one of the first clock net or the second clock net is driven to an intermediate state between the first clock state and the second clock state in response to coupling the first clock wire to the second clock wire.

25. The method of claim 15, wherein coupling the first clock wire to the second clock wire comprises coupling the first clock wire to the second clock wire while the first clock net and the second clock net are in an undriven state.

* * * * *